United States Patent
Li et al.

(10) Patent No.: US 10,704,743 B2
(45) Date of Patent: Jul. 7, 2020

(54) SATURATED AMBER LIGHT SOURCE DEVICE

(71) Applicant: YLX INCORPORATED, Shenzhen (CN)

(72) Inventors: Yi Li, Shenzhen (CN); Quan Zhang, Shenzhen (CN)

(73) Assignee: YLX INCORPORATED, Shenzhen (CN)

( * ) Notice: Subject to any disclaimer, the term of this patent is extended or adjusted under 35 U.S.C. 154(b) by 373 days.

(21) Appl. No.: 15/523,653

(22) PCT Filed: Oct. 27, 2015

(86) PCT No.: PCT/CN2015/092906
§ 371 (c)(1),
(2) Date: May 1, 2017

(87) PCT Pub. No.: WO2016/066078
PCT Pub. Date: May 6, 2016

(65) Prior Publication Data
US 2017/0314744 A1  Nov. 2, 2017

(30) Foreign Application Priority Data
Oct. 29, 2014 (CN) .................... 2014 2 0638606 U

(51) Int. Cl.
*F21K 9/64* (2016.01)
*F21V 9/40* (2018.01)
(Continued)

(52) U.S. Cl.
CPC ................. *F21K 9/64* (2016.08); *F21K 9/69* (2016.08); *F21S 2/00* (2013.01); *F21V 9/08* (2013.01);
(Continued)

(58) Field of Classification Search
CPC ..... F21K 9/64; F21K 9/69; F21V 9/08; F21V 9/20; F21V 9/32; F21V 9/40; F21V 13/02; F21S 2/00; F21W 2131/406; G02B 27/149
See application file for complete search history.

(56) References Cited

U.S. PATENT DOCUMENTS 7,070,300 B2  7/2006  Harbers
7,850,335 B2  12/2010  Hsu
(Continued)

FOREIGN PATENT DOCUMENTS

CN  201344389 Y  11/2009
CN  102709449 A  10/2012
(Continued)

OTHER PUBLICATIONS

Zhang et al, "Device for increasing color rendering index of LED light source", Oct. 15, 2014, Espacenet, Patent Translate Powered by EPO and Google, 19 Pages total, Bibliographic data pp. 1-2, Claims pp. 1-3, Description pp. 1-11, and Figures 1-6 pp. 10-12.*
(Continued)

*Primary Examiner* — Alan B Cariaso
(74) *Attorney, Agent, or Firm* — Anova Law Group, PLLC

(57) ABSTRACT

The present disclosure discloses a light source device. The light source device comprises a light source array configured to emit an excitation light; a phosphor sheet arranged in a propagation direction of the excitation light and configured to receive the excitation light to emit an excited unsaturated amber light; and a cutoff filter arranged along a propagation direction of the unsaturated amber light and configured to filter the unsaturated amber light to obtain a saturated amber light.

20 Claims, 3 Drawing Sheets

(51) Int. Cl.
  *F21K 9/69* (2016.01)
  *F21V 9/08* (2018.01)
  *F21S 2/00* (2016.01)
  *F21V 13/02* (2006.01)
  *F21V 9/20* (2018.01)
  *F21V 9/32* (2018.01)
  *G02B 27/14* (2006.01)
  *F21W 131/406* (2006.01)
  *F21Y 115/10* (2016.01)

(52) U.S. Cl.
  CPC ............... *F21V 9/20* (2018.02); *F21V 9/32* (2018.02); *F21V 9/40* (2018.02); *F21V 13/02* (2013.01); *F21W 2131/406* (2013.01); *F21Y 2115/10* (2016.08); *G02B 27/149* (2013.01)

(56) References Cited

U.S. PATENT DOCUMENTS

2007/0164268 A1* 7/2007 Curran ............... F21V 3/00
                                                     257/13
2010/0254115 A1* 10/2010 Wegh ............... F21S 10/02
                                                     362/84
2012/0140435 A1* 6/2012 Li ..................... G09F 13/20
                                                     362/84
2016/0290573 A1* 10/2016 Allen ................ F21K 9/233
2017/0045201 A1* 2/2017 Jones ................. F21V 9/30
2017/0139113 A1* 5/2017 Peeters ............. F21S 41/24

FOREIGN PATENT DOCUMENTS

CN       203880619 U    10/2014
CN       204176387 U    2/2015

OTHER PUBLICATIONS

Jeong Rok Oh et al., "Full down-conversion of amber-emitting phosphor-converted light-emitting diodes with powder phosphors and a long-wave pass filter", May 24, 2010, Optics Express, vol. 10 No. 11, pp. 1-10.*
The World Intellectual Property Organization (WIPO) International Search Report for PCT/CN2015/092906 dated Jan. 11, 2016 p. 1-6.

* cited by examiner

SATURATED AMBER LIGHT SOURCE DEVICE

CROSS-REFERENCES TO RELATED APPLICATIONS

This application is a national stage patent application of PCT application No. PCT/CN2015/092906, filed on May 6, 2016, which claims priority to Chinese Patent Application No. 201420638606.3, filed on Oct. 29, 2014, the entire content of all of which is incorporated herein by reference.

FIELD OF THE INVENTION

The present disclosure relates to the technical field of optical technology, and more specifically, relates to a light source device.

BACKGROUND

With the rapid development of solid-state semiconductor light sources and the global energy shortage, light emitting diode (LED) light sources have been widely used in all kinds of industry and trend to replace traditional light sources, which are featured with various advantages, such as high luminous efficiency, low power consumption, long life, energy saving, environment-friendly, and controllable brightness and color temperature, etc. It is believed that, as the cost of LED light sources reduces and the light efficiency of LED light sources increases, LED light sources will completely replace the traditional light source in the near future.

Currently, the three primary colors (R, G and B) LED light sources have been widely used in the field of semiconductor lighting, such as stage lighting and moving head lighting. For the stage or other professional applications, saturated amber light is highly desired to improve the color of the mixed white light. However, the existing LED chip emitting amber light is very sensitive to temperature. As the temperature of the LED chip increases, the luminous flux of the amber light emitted by the LED chip is significantly reduced. As shown in FIG. 1, the luminous flux of the LED chip at 120° C. drops to about 30% the luminous flux of the LED chip at 25° C. Thus, how to improve the luminous flux of the amber light emitted by the LED light source becomes a technical problem that urgently needs to be resolved.

BRIEF SUMMARY OF THE DISCLOSURE

The present disclosure provides a light source device to improve the luminous flux of the amber light emitted by the light source device.

In view of this, the present disclosure discloses a light source device. The light source device comprises: a light source array configured to emit excitation light; a phosphor sheet arranged in a propagation direction of the excitation light and configured to receive the excitation light 10 emit an excited unsaturated amber light; and a cutoff filter arranged along a propagation direction of the unsaturated amber light and configured to filter the unsaturated amber light to obtain a saturated amber light.

Further, the light source array includes blue light-emitting diode (LED) chips.

Further, the phosphor sheet is disposed above the light source array, and the cutoff filter is disposed above the phosphor sheet.

Further, a gap is formed between the phosphor sheet and the light source array.

Further, the light source device also includes a crossline lens. The light source array is disposed on three light incident passages of the crossline lens, the cutoff filter is disposed outside a light exit passage of the crossline lens, the phosphor sheet is disposed between the light exit passage of the crossline lens and the cutoff filter, and the excitation light transmits the crossline lens, then is incident onto the phosphor sheet.

Further, a gap is formed between the phosphor sheet and the cutoff filter.

Further, the light source device also includes a crossline lens. The light source array is disposed outside three light incident passages of the crossline lens, the phosphor sheet is disposed on a light-emitting surface of the light source array, the cutoff filter is disposed outside a light exit passage of the crossline lens, and the unsaturated amber light transmits the crossline lens, then is incident onto the cutoff filter.

Further, the excitation light has a wavelength range of approximately 440 to 475 nm, and the unsaturated amber light has a peak wavelength of approximately 520 to 580 nm.

Further, the cutoff filter has a cutoff wavelength of approximately 550 to 590 nm, and the saturated amber light has a peak wavelength of approximately 590 to 610 nm.

The disclosed light source device generates an unsaturated amber light through exciting a phosphor sheet by excitation light emitted form a light source army, and obtains a saturated amber light through filtering the unsaturated amber light by a cutoff filter. Because the light source array is insensitive to temperature, the luminous flux of the excitation light emitted by the light source array at high temperature may be increased. The luminous flux of the amber light emitted by the light source device is also increased, accordingly.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

It should be noted that, in the present disclosure, the disclosed embodiments and the features of the disclosed embodiments may be combined under conditions without conflicts. The present disclosure will be described in detail below with reference to the accompanying drawings and disclosed embodiments.

It should be noted that, the terminology used herein is for the purpose of describing particular embodiments only and is not intended to be a limit of the invention. As used herein, the singular forms "a", "an" and "the" are intended to include the plural forms as well, unless the context clearly indicates otherwise. It will be further understood that the terms "comprise/comprises/comprising" and/or "include/includes/including" when used in this specification, specify the presence of stated features, steps, operations, elements, components, and/or groups thereof.

Spatially relative terms, such as "above," "over" "on," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, when the device in the figures is turned over, elements described as "above" or "on" other elements or features would then be oriented "below" or "beneath" the other elements or features. Thus, the term "above" can encompass both an orientation of above and below. The device may be otherwise oriented (rotated 90 degrees or at other orientations) and the spatially relative descriptors used herein interpreted accordingly.

Figure 1:
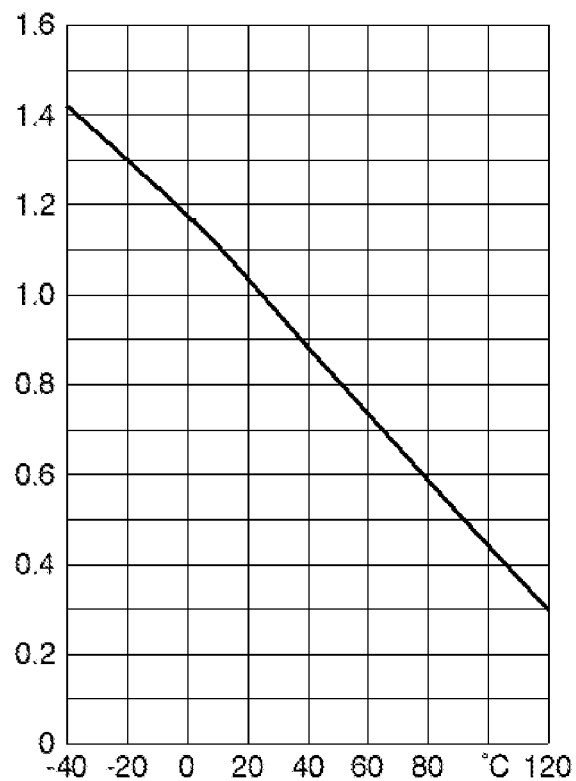
FIG. 1 illustrates temperature dependent luminous flux of existing amber LED light.
Figure 2:
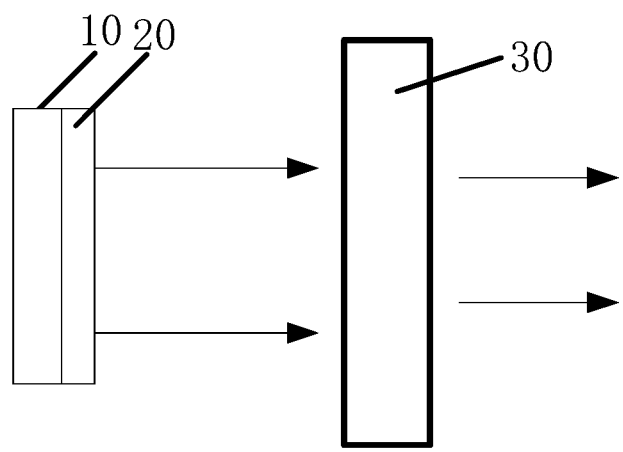
FIG. 2 illustrates a cross-sectional view of an exemplary light source device consistent with the disclosed embodiments.
Figure 3:
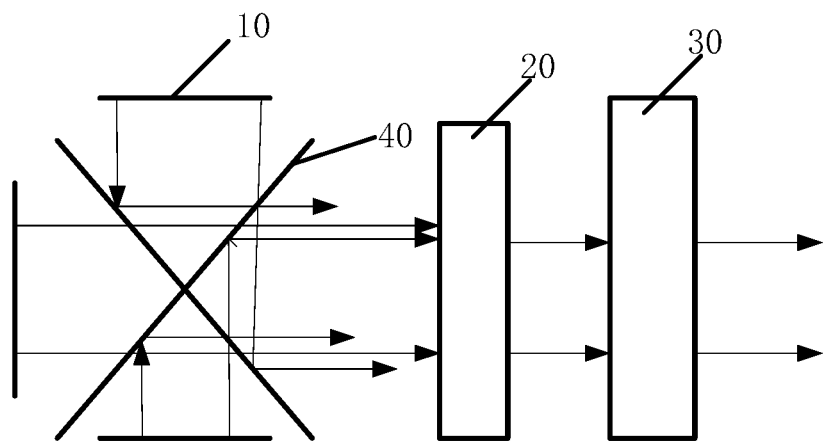
FIG. 3 illustrates a cross-sectional view of another exemplary light source device consistent with the disclosed embodiments.
Figure 4:
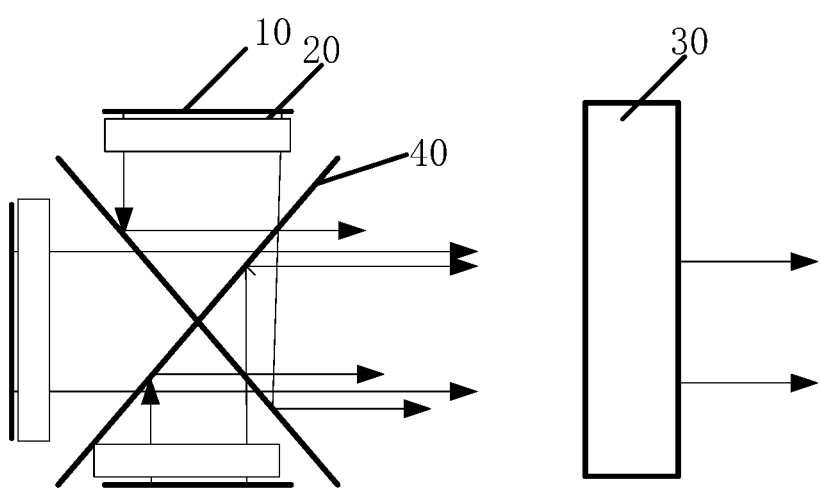
FIG. 4 illustrates a cross-sectional view of another exemplary light source device consistent with the disclosed embodiments.

As discussed in the background, the existing LED chip emitting amber light is very sensitive to temperature, and as the temperature of the LED chip increases, the luminous flux of the amber light emitted by the LED chip is significantly reduced. To solve one or more problems set forth above, the inventors conducted extensive studies and disclosed a light source device. As shown in FIGS. 2 to 4, the light source device may comprise a light source array 10 configured to emit an excitation light; a phosphor sheet 20 arranged in the propagation direction of the excitation light and configured to receive the excitation light to emit an excited unsaturated amber light; and a cutoff filter 30 arranged along the propagation direction of the unsaturated amber light and configured to filter the unsaturated amber light to obtain a saturated amber light.

In the disclosed embodiments, the light source device may generate the unsaturated amber light through exciting the phosphor sheet 20 by the excitation light emitted from the light source array 10, then obtain the saturated amber light through filtering the unsaturated amber light by the cutoff filter 30. Because the light source array 10 may be insensitive to temperature, the luminous flux of the excitation light emitted by the light source array 10 at high temperature may be increased. Accordingly, the luminous flux of the amber light emitted by the light source device may be increased.

Exemplary embodiments of the light source device provided by the present disclosure will be described in detail below. However, these exemplary embodiments may be embodied in many different forms and should not be construed as limited to the embodiments set forth herein. It is to be understood that these embodiments are provided to enable the disclosure of the present disclosure to be thorough and complete, and to fully convey the concepts of these exemplary embodiments to those of ordinary skill in the art, in the drawings, the shape and size may be exaggerated, distorted, or simplified for clarity. Wherever possible, the same reference numbers will be used throughout the drawings to refer to the same or like parts, and a detailed description thereof may be omitted.

In the disclosed embodiments, location and the connection relationship between the light source array 10, the phosphor sheet 20, and the cutoff filter 30 may be embodied in many forms. In one embodiment, as shown in FIG. 2, the phosphor sheet 20 may be disposed above the light source array 10, and the cutoff filter 30 may be disposed above the phosphor sheet 20. Thereinto, the phosphor sheet 20 may be in contact with the light-emitting surface of the light source array 10, or a gap may be formed between the phosphor sheet 20 and the light source array 10. Similarly, the cutoff filter 30 may be in contact with the surface of the phosphor sheet 20, or a gap may be formed between the phosphor sheet 20 and the cutoff filter 30.

To obtain more uniform excitation light emitted from the light source array 10 and to have more excitation light incident onto the phosphor sheet 20, in another embodiment, as shown in FIG. 3, the light source device may further comprise a crossline lens 40. The light source array 10 may be disposed on the three light incident passages (i.e., port of the light incident channel) of the crossline lens 40, and the cutoff filter 30 may be disposed outside the light exit passage (i.e., port of the light exit channel) of the crossline lens 40. The phosphor sheet 20 may be disposed between the light exit passage of the crossline lens 40 and the cutoff filter 30. The excitation light transmits the crossline lens 40, then is incident onto the phosphor sheet 20. Thereinto, the phosphor sheet 20 may be in contact with the light-emitting surface of the light source array 10, or a gap may be formed between the phosphor sheet 20 and the light source array 10. Similarly, the cutoff filter 30 may be in contact with the surface of the phosphor sheet 20, or a gap may be formed between the phosphor sheet 20 and the cutoff filter 30.

To obtain more uniform unsaturated amber light and to have more unsaturated amber light propagate towards the cutoff filter 30, in another embodiment, as shown in FIG. 4, the light source device may further comprise the crossline lens 40. The light source array 10 may be disposed outside the three light incident passages of the crossline lens 40, the phosphor sheet 20 may be disposed above the light-emitting surface of the light source array 10, and the cutoff filter 30 may be disposed outside the light exit passage of the crossline lens 40. The unsaturated amber light transmits the crossline lens 40, then is incident onto the cutoff filter 30. Thereinto, the phosphor sheet 20 may be in contact with the light-emitting surface of the light source array 10, or a gap may be formed between the phosphor sheet 20 and the light source array 10.

In the disclosed embodiments, the light source array 10 may include blue LED chips commonly used in the art. In one embodiment, the excitation light emitted from the light source array 10 may have a wavelength range of approximately 440 nm to 475 nm. The phosphor sheet 20 may include a phosphor material commonly used in the art, such as antimony, manganese-activated calcium halophosphate Phosphor, and rare-earth-doped phosphor, etc. After exciting the phosphor sheet 20 with the excitation light with a wavelength range of approximately 440 nm to 475 nm, an unsaturated amber light with a peak wavelength of approximately 520 nm to 580 nm is obtained.

The cutoff filter 30 may be able to completely filter Out the light with long or short wavelength from a polychromatic light and, meanwhile, only transmit the light with a desired wavelength band. The cutoff filter 30 may be selected according to the desired wavelength band. To obtain more saturated amber light, in one embodiment, the cutoff wavelength of the cutoff filter 30 may be approximately 550 nm to 590 nm. Accordingly, the peak wavelength of the saturated amber light may be approximately 590 nm to 610 nm.

The light source device provided by the present disclosure will be described below with reference to FIG. 5.

Figure 5:
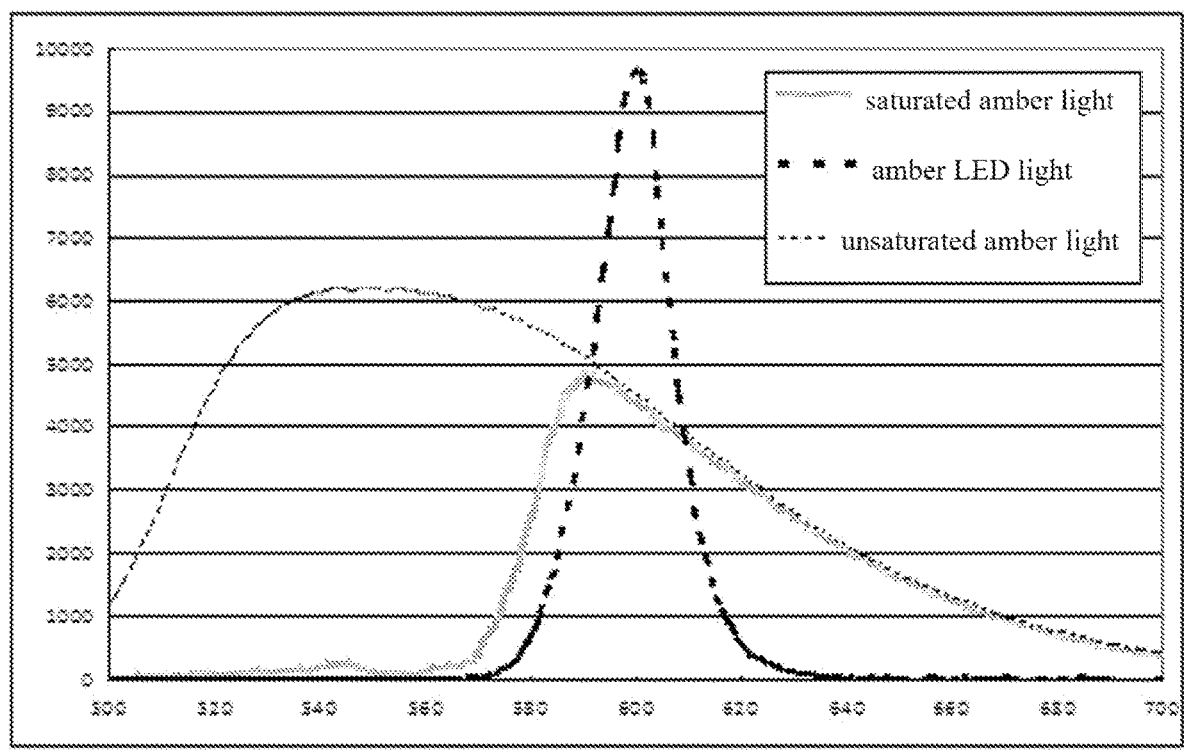
FIG. 5 illustrates a spectrum of the unsaturated amber light and the saturated amber light generated by an exemplary light source device consistent with the disclosed embodiments.

FIG. 5 illustrates a spectrum of the unsaturated amber light and the saturated amber light produced by an exemplary light source device consistent with the disclosed embodiments. As shown in FIG. 5, the unsaturated amber light generated by the disclosed light source device may have a peak wavelength of approximately 550 nm and a peak light intensity of approximately 6200. The saturated amber light generated by the disclosed light source device may have a peak wavelength of approximately 594 nm, a wavelength range of approximately 540-700 nm, and a peak light intensity of approximately 5000. The existing amber LED light may have a peak wavelength of approximately 600 nm, a wavelength range of approximately 570-640 nm, and a peak light intensity of approximately 9700. Compared to the existing amber LED light, the saturated amber light generated by the disclosed light source device may have a very similar wavelength (particularly the peak wavelength) but a lower peak light intensity. Thus, the color of the saturated amber light generated by the disclosed light source device may look the same as the amber LED light.

The inventors also analyzed the color coordinates of the saturated amber light emitted from the disclosed light source device and the amber light emitted from the existing LED chip. The results show that the color coordinate of the saturated amber light generated by the disclosed light source device is almost the same as which of the amber LED light in the existing technology. Thus, the saturated amber light generated by the disclosed light source device may look with a same color as the amber LED light.

According to the disclosed embodiments, the disclosed light source devices may achieve the following technical effects. The disclosed light source device may generate an unsaturated amber light through exciting the phosphor sheet by an excitation light emitted from a light source array, then obtain a saturated amber light through filtering the unsaturated amber light by a cutoff filter. Because the light source array may be insensitive to temperature the luminous flux of the excitation light emitted by the light source array at high temperature may be increased and, accordingly, the luminous flux of the amber light emitted by the light source device may be increased.

The above-disclosed embodiments are exemplary embodiments of the present disclosure, and are not intended to limit the scope of the present disclosure. Various modifications to these embodiments will be readily apparent to those skilled in the art. Any modifications, equivalents, improvements, etc. within the spirit and principles of the present disclosure will be included in the scope of the present disclosure.

What is claimed is:

1. A light source device, comprising:
   a light source array, configured to emit an excitation light;
   a phosphor sheet arranged in a propagation direction of the excitation light and configured to receive the excitation light to emit an excited unsaturated amber light; and
   a cutoff filter arranged along a propagation direction of the unsaturated amber light and configured to filter the unsaturated amber light to obtain a saturated amber light.

2. The light source device according to claim 1, wherein, the light source array includes blue light-emitting diode (LED) chips.

3. The light source device according to claim 1, wherein, the phosphor sheet is disposed above the light source array, and the cutoff filter is disposed above the phosphor sheet.

4. The light source device according to claim 3, wherein, a gap is formed between the phosphor sheet and the light source array.

5. The light source device according to claim 1, further including:
   a crossline lens,
   wherein the light source array is disposed on three light incident passages of the crossline lens,
   the cutoff filter is disposed outside a light exit passage of the crossline lens,
   the phosphor sheet is disposed between the light exit passage of the crossline lens and the cutoff filter, and
   the excitation light transmits the crossline lens, then is incident onto the phosphor sheet.

6. The light source device according to claim 5, wherein, a gap is formed between the phosphor sheet and the cutoff filter.

7. The light source device according to claim 1, further including:
   a crossline lens,
   wherein the light source array is disposed outside three light incident passages of the crossline lens,
   the phosphor sheet is disposed on a light-emitting surface of the light source array,
   the cutoff filter is disposed outside a light exit passage of the crossline lens, and
   the unsaturated amber light transmits through the crossline lens, then is incident onto the cutoff filter.

8. The light source device according to claim 1, wherein, the excitation light has a wavelength range of approximately 440 nm to 475 nm, and the unsaturated amber light has a peak wavelength of approximately 520 nm to 580 nm.

9. The light source device according to claim 1, wherein, the cutoff filter has a cutoff wavelength of approximately 550 nm to 590 nm, and the saturated amber light has a peak wavelength of approximately 590 nm to 610 nm.

10. The light source device according to claim 2, wherein, the excitation light has a wavelength range of approximately 440 nm to 475 nm, and the obtained unsaturated amber light has a peak wavelength of approximately 520 nm to 580 nm.

11. The light source device according to claim 2, wherein, the cutoff filter has a cutoff wavelength range of approximately 550 nm to 590 nm, and the saturated amber light has a peak wavelength of approximately 590 nm to 610 nm.

12. The light source device according to claim 3, wherein, the excitation light has a wavelength range of approximately 440 nm to 475 nm, and the obtained unsaturated amber light has a peak wavelength of approximately 520 nm to 580 nm.

13. The light source device according to claim 3, wherein, the cutoff filter has a cutoff wavelength of approximately 550 nm to 590 nm, and the saturated amber light has a peak wavelength of approximately 590 nm to 610 nm.

14. The light source device according to claim 4, wherein, the excitation light has a wavelength range of approximately 440 nm to 475 nm, and the obtained unsaturated amber light has a peak wavelength of approximately 520 nm to 580 nm.

15. The light source device according to claim 4, wherein, the cutoff filter has a cutoff wavelength of approximately 550 nm to 590 nm, and the saturated amber light has a peak wavelength of approximately 590 nm to 610 nm.

16. The light source device according to claim 5, wherein, the excitation light has a wavelength range of approximately 440 nm to 475 nm, and the obtained unsaturated amber light has a peak wavelength of approximately 520 nm to 580 nm.

17. The light source device according to claim 5, wherein, the cutoff filter has a cutoff wavelength of approximately 550 nm to 590 nm, and the saturated amber light has a peak wavelength of approximately 590 nm to 610 nm.

18. The light source device according to claim 6, wherein, the excitation light has a wavelength range of approximately 440 nm to 475 nm, and the obtained unsaturated amber light has a peak wavelength of approximately 520 nm to 580 nm.

19. The light source device according to claim 6, wherein, the cutoff filter has a cutoff wavelength of approximately 550 nm to 590 nm, and the saturated amber light has a peak wavelength of approximately 590 nm to 610 nm.

20. The light source device according to claim 7, wherein, the excitation light has a wavelength range of approximately 440 nm to 475 nm, the obtained unsaturated amber light has a peak wavelength of approximately 520 nm to 580 nm, and the cutoff filter has a cutoff wavelength of approximately 550 nm to 590 nm, and the saturated amber light has a peak wavelength of approximately 590 nm to 610 nm.

\* \* \* \* \*